July 22, 1969  C. F. PLATH  3,456,385

PLANT CUTTING SUPPORTS

Filed Nov. 18, 1966

INVENTOR.
CHARLES F. PLATH

BY *Harry Cohen*

ATTORNEY

United States Patent Office 3,456,385
Patented July 22, 1969

3,456,385
PLANT CUTTING SUPPORTS
Charles F. Plath, Nutley, N.J.
(12 Ampere Parkway, East Orange, N.J. 07017)
Filed Nov. 18, 1966, Ser. No. 595,481
Int. Cl. A01g *31/00;* B63c *9/12*
U.S. Cl. 47—1.2                                        5 Claims

ABSTRACT OF THE DISCLOSURE

This invention relates to floating supports or holders which are used to hold plants, cuttings from plants and flowers in a vertical position while floating on a body of water with the purpose of growing, propagating or showing said plants, cuttings from plants and flowers.

The invention consists of a device whose end seal design and dimensions insure that a considerable length of its horizontal center presses together to releasably hold plants, cuttings from plants and flowers without damaging them while being inserted in, extracted from or while being held in such holders or supports.

---

This invention relates to supports or holders which are primarily useful for hloding plant cuttings with their cut ends immersed in water and their leaf ends exposed to light and air for the root development of the cuttings. The invention relates also to a method of making such holders or supports.

The primary object of the invention is the provision of a floatable support or holder for plant cuttings whereby the holder can float on water in a suitable receptacle and hold the cuttings in the above indicated cut-end and leaf-end positions.

A feature of the invention is that the floatable holder rises and falls with the water level in the receptacle so that the cut-end remains immersed in the water should the water level fall, from a higher level to a lower level due, for example, to evaporation, thereby making unecessary close or frequent watching of the water level.

Briefly described, the floatable support or holder comprises an inflated flexible plastic tube folded upon itself and sealed in such fashion that two confronting inflated tubular members are provided and held in mutually pressing relation against each other by sealed end portions of the folded tube. When plant cuttings are to be treated for root development, the cut ends of the cuttings are interposed between the confronting surfaces of said inflated tubular members which resiliently hold them in the above indicated desired positions and when the floatable support is placed in a water-containing receptacle, the floating support can move freely on the water in various directions for optimum exposure distribution of light on the leaf ends of the cuttings.

The above and other objects, features and advantages of this invention will be clearly understood from the following description considered in connection with the accompanying illustrative drawings of the presently preferred embodiment of the invention.

Figure 1:
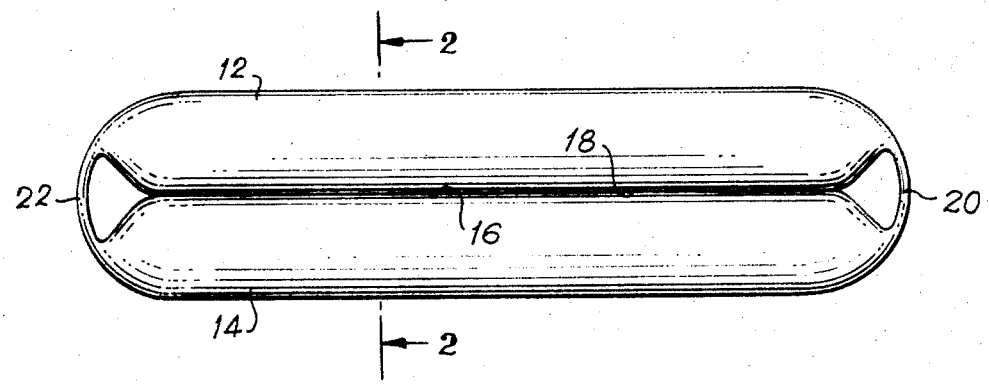
FIG. 1 is a top view of the floatable support or holder according to the invention.
Figure 2:
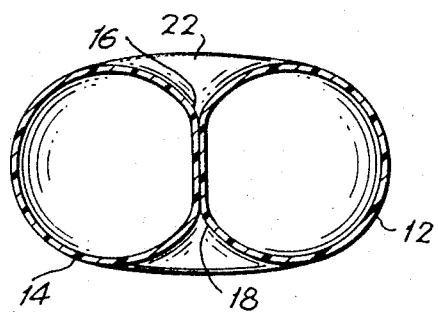
FIG. 2 is a sectional view of the line 2—2 of FIG. 1.

Referring now to the drawings in detail, the floatable suport or holder 10 of the present invention is formed of flexible plastic tubing such as, for example, vinyl or other heat sealable plastic in the form of tubing. The diameter of the tubing may vary within practical limits, diameters of ½", 1" and 1½", being indicative of suitable diameters but not limitative of the tube diameters. As illustrated, the tubing is pre-inflated for forming a plurality of supports or holders, as hereinafter described. Referring first to FIGS. 1 and 2, the holder 10 comprises two confronting tubular members 12 and 14 having confronting surfaces 16 and 18, respectively, which are resiliently biased against each other for releasably holding a plant cutting or other object therebetween when at least part of the object is inserted between said confronting surfaces. Tubular members 12 and 14 are integral with the longitudinally spaced transversely sealed portions 20 and 22. As here shown, said longitudinally spaced sealed transverse portions are disposed at the opposite ends respectively of the support or holder 10 and act to resiliently bias the confronting surfaces 16 and 18 of the tube members 12 and 14 against each other so that when an object or part thereof is inserted between said confronting surfaces, they are resiliently held removably in position between said surfaces.

Figure 3:
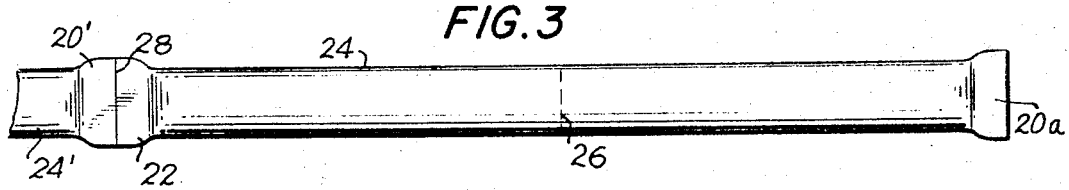
FIG. 3 is a plan view of inflated tubing provided with longitudinal spaced transverse sealed portions.
Figure 4:
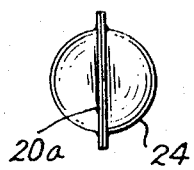
FIG. 4 is an end view of the tubing shown by FIG. 3.

The presently preferred method of forming the support or holder 10 will now be described with reference to FIGS. 3 and 4. A length of inflated tubing 24 is first provided with a heat sealed end portion 20a which is a flat transverse portion of the tubing and with a similar heat sealed portion 22a spaced longitudinally of heat sealed portion 20a. Then the tubing is folded upon itself along a medium transverse line indicated at 26 and heat sealed portions 20a and 22a are then heat sealed to each other in face-to-face relation, thereby providing the heat sealed end portions 20 and 22 illustrated by FIGS. 1 and 2. These heat sealed end portions act to resiliently bias the tubular members 12 and 14 at their confronting surfaces 16 and 18, respectively.

It will be noted that although the tubing 24 is circular in cross section, it is somewhat flattened at its confronting surfaces 16 and 18 so that the gripping action on the object held therebetween is increased by reason of the increase in the areas of the confronting surfaces as a result of said flattening of the tubing when the tubing is folded upon itself and the ends 20a and 22a heat sealed to each other in surface-to-surface relation. The upper portions of surfaces 16 and 18 left curved to facilitate the insertion of the stem end of the cutting or an end part of some other object.

It will be understood that the length of tubing 24 can be initially greater than the length required to form a single support or holder 10 and that when the sealed portion 22a is formed, the tubing is simultaneously cut to provide a length of tubing to form the holder 10. In FIG. 3 there is shown a sealed portion 20a which is adjacent the sealed portion 22a, and the line of severance is indicated at 28, a part of the tubing with a heat sealed transverse portion 20' being indicated at one end of the tubing 24' from which the length of tubing 24 is cut, said tubing 24' being indefinite in length and sufficiently long to form a multiplicity of tubing lengths 24 for the manufacture of a multiplicity of holders or supports 10 as described above with reference to FIGS. 1 and 2.

In the use of the floatable holder or support 10 for plant cuttings to aid in the root development, one or more cuttings are inserted between the confronting surfaces 16 and 18 at the stem ends of the cuttings so that said ends project below the support or holder 10 and are immersed in the water in the receptacle in which said holder is placed, while the leaf ends of the cutting are exposed to light and air. The floatable holder or support 10 may be made in various sizes, i.e., lengths and tube diameters to accommodate cuttings of various sizes and various numbers of cuttings.

In addition to the above mentioned described features and advantages of the invention, the holder or support 10 has the advantages, among others, that it enables a large number of cuttings to be mounted for root development at the same time in a comparatively small space and that it is washable, non-toxic and re-usable; it is also small in size and of light weight.

When the invention has been described with reference to pre-inflated flexible plastic tubing, it is within the scope of the invention to provide the heat sealed transverse portions in non-inflated tubing and to inflate the tubular members 12 and 14 through suitable valve inlets such as those, for example, provided on automobile inner tubes. Also, while I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A plant cutting support device comprised of a flexible-walled material, and having at least two inflated members interconnected at their outer ends, each of said members being resiliently biased against an adjacent member, said outer end structure being inflatable in part to define fluid communication between said members, said device being adapted to float on an aqueous media, and said adjacent members being adapted to receive plant portions therebetween.

2. A device according to claim 1 wherein said device is pre-inflated, i.e., not valved.

3. A device according to claim 1 further comprising valve means in combination therewith to inflate and deflate the same.

4. A device according to claim 1 wherein said device material is comprised of a synthetic resin.

5. A device according to claim 1 wherein, the member diameter is in a range from approximately $\frac{1}{2}''-1\frac{1}{2}''$.

References Cited

UNITED STATES PATENTS

| | | | |
|---|---|---|---|
| 1,127,930 | 2/1915 | Smack | 9—345 |
| 2,715,231 | 8/1955 | Marston | 9—11.1 |
| 3,025,629 | 3/1962 | Sears | 43—55 |

OTHER REFERENCES

Keeping the Home Shipshape, Popular Science, April 1950, vol. 156, No. 4, p. 173 relied on.

ROBERT E. BAGWILL, Primary Examiner

U.S. Cl. X.R.

9—345